(12) United States Patent
Robin et al.

(10) Patent No.: US 7,797,700 B2
(45) Date of Patent: Sep. 14, 2010

(54) METHOD OF EXECUTING CONCURRENT TASKS BY A SUBSYSTEM MANAGED BY A CENTRAL PROCESSOR

(75) Inventors: Frederic Robin, Saint Nazaire les Eymes (FR); Alain Artieri, Saint-Martin d'Heres (FR); Stephane Audrain, Grenoble (FR); Jacques Dumarest, Notre Dame de Mesage (FR); Vincent Lefftz, Grenoble (FR)

(73) Assignee: STMicroelectronics S.A., Montrouge (FR)

( * ) Notice: Subject to any disclaimer, the term of this patent is extended or adjusted under 35 U.S.C. 154(b) by 1786 days.

(21) Appl. No.: 10/831,539

(22) Filed: Apr. 23, 2004

(65) Prior Publication Data

US 2004/0268355 A1  Dec. 30, 2004

(30) Foreign Application Priority Data

Apr. 24, 2003  (FR) .................................. 03 05064

(51) Int. Cl.
*G06F 9/455* (2006.01)
*G06F 9/46* (2006.01)
*G06K 9/36* (2006.01)
*H04N 9/80* (2006.01)
*H04N 5/91* (2006.01)
*H04N 7/173* (2006.01)

(52) U.S. Cl. ............................ 718/100; 718/1; 382/232; 382/233; 382/235; 386/12; 386/27; 386/61; 386/66; 725/32; 725/109; 725/110; 725/139; 725/151; 719/313; 719/314

(58) Field of Classification Search ...................... 718/1, 718/100, 101, 102, 103, 104, 105, 107; 386/12, 386/27, 33, 35, 48, 61, 66; 725/20, 32, 105, 725/109, 110, 135, 139, 143, 151; 382/232, 382/233, 234, 235; 719/313–316
See application file for complete search history.

(56) References Cited

U.S. PATENT DOCUMENTS 3,891,974 A * 6/1975 Coulter et al. ................ 703/23
4,318,173 A * 3/1982 Freedman et al. ........... 718/103

(Continued)

FOREIGN PATENT DOCUMENTS

WO    WO 98/44745    10/1998

OTHER PUBLICATIONS

French Preliminary Search Report dated Feb. 17, 2004 for French Application No. 03-05064.

*Primary Examiner*—Meng-Ai An
*Assistant Examiner*—Abdullah Al Kawsar
(74) *Attorney, Agent, or Firm*—Lisa K. Jorgenson; Stephen Bongini; Fleit Gibbons Gutman Bongini & Bianco P.L.

(57) ABSTRACT

Systems and methods are provided for processing different concurrent tasks by a subsystem managed by a central processor. Each tasks is comprised of successive messages including a first message, intermediate messages, and a last message. Each intermediate message comprises a subtask parameter and a link to the next message that indicates the time when the next message is to be processed. The central processor and the subsystem are connected to a storage memory and several counters associated with respective tasks. The system and method reduce task disruptions of the system.

29 Claims, 2 Drawing Sheets

U.S. PATENT DOCUMENTS

| | | | |
|---|---|---|---|
| 5,005,122 A * | 4/1991 | Griffin et al. | 709/203 |
| 5,563,986 A * | 10/1996 | Suzuki | 358/1.15 |
| 5,675,796 A * | 10/1997 | Hodges et al. | 718/100 |
| 5,818,967 A | 10/1998 | Bhattacharjee et al. | |
| 5,889,983 A * | 3/1999 | Mittal et al. | 712/223 |
| 5,902,352 A * | 5/1999 | Chou et al. | 718/102 |
| 6,061,709 A * | 5/2000 | Bronte | 718/103 |
| 6,065,089 A * | 5/2000 | Hickerson et al. | 710/266 |
| 6,122,668 A * | 9/2000 | Teng et al. | 709/231 |
| 6,260,058 B1 * | 7/2001 | Hoenninger et al. | 718/107 |
| 6,542,541 B1 | 4/2003 | Wang et al. | |
| 6,877,157 B2 * | 4/2005 | Marco | 718/102 |
| 6,912,610 B2 * | 6/2005 | Spencer | 710/240 |
| 7,150,016 B2 * | 12/2006 | Bauhofer et al. | 718/100 |
| 7,322,033 B2 * | 1/2008 | Ito | 718/104 |
| 2002/0124064 A1 * | 9/2002 | Epstein et al. | 709/221 |

* cited by examiner

☐ STP
▨ NMP
▧ NML
■ ETS

METHOD OF EXECUTING CONCURRENT TASKS BY A SUBSYSTEM MANAGED BY A CENTRAL PROCESSOR

CROSS-REFERENCE TO RELATED APPLICATIONS

This application is based upon and claims priority from prior French Patent Application No. 03-05064, filed Apr. 24, 2003, the entire disclosure of which is herein incorporated by reference.

BACKGROUND OF THE INVENTION

1. Field of the Invention

The present invention relates to managing tasks executed by a subsystem, and more particularly to the management by a central processor of a subsystem which processes tasks in real time.

2. Description of Related Art

A system that includes a central processor, possibly operating with a real-time operating system, and a subsystem managed by the processor is typically used in multimedia applications. In particular, the subsystems are used to execute audio or video decompression tasks on data flows (streams).

It is for instance known to manage a video decoder using an STi5580 central processor. Conventionally, the processor sends a task to be executed by the decoder. A flow of elementary subtasks constitutes a task (e.g., for a task of decoding successive images). In practice, the video decoder comprises a digital signal processor (generally referred to as a "DSP"). After the subtask is sent, the subsystem must respond to the central processor, then the central processor sends new subtasks to the subsystem.

This procedure suffers from drawbacks. In particular, it requires the processor to have a very short response time. This implies the use of a high-performance processor and makes its integration more difficult. Moreover, many processor operating systems do not guarantee a sufficiently short response time. These drawbacks are more particularly felt in real-time applications, especially in multimedia applications. Indeed, the playing or recording multimedia data is sometimes significantly disrupted for the user by the operation of the processor.

In addition, the processor's management of responses from the subsystem slows down the execution of other tasks by the processor. The central processor's memory can then be insufficient and cause an erasure of data to be processed. On a separate account, the precision in the timing of subtasks by the subsystem is insufficient.

Multimedia functions such as pause, fast forward, and the like are not easy to manage, and the synchronization of image and sound is also difficult to manage.

These requirements also imply a relatively complex and laborious development, integration, and qualification of the application software.

Real-time management is also difficult to integrate into the subsystem's operating system.

SUMMARY OF THE INVENTION

In view of these drawbacks, it is an object of the present invention to provide methods of executing tasks and systems that overcome one or several of these drawbacks.

One embodiment of the present invention provides a method of processing concurrent tasks by a subsystem managed by a central processor. Each of the tasks is comprised of successive messages including a first message, intermediate messages, and a last message, and each of the intermediate messages comprises at least one subtask parameter and a link to the next message that indicates a time of processing of the next message. According to the method, for each task, there is a step of writing by the central processor, and a step of processing by the subsystem. The writing step including the sub-step of writing a message in a memory. If a counter is initially free for access, access to the counter is prohibited by the subsystem. And then if the counter has a zero value, a link is written in the subsystem that indicates a time of processing of the first message by the subsystem. Otherwise, a link to the next message is written in the subsystem, with the link to the next message being included in the message written in the memory. The writing step also includes the sub-steps of incrementing the counter by a number representative of presence of the message of the task in the memory, and ending the prohibition against accessing the counter. The processing step includes the sub-steps of if the counter is initially free for access, prohibiting access to the counter by the central processor; if the counter has a non-zero value, reading the link to the next message and decrementing the counter; ending the prohibition against accessing the counter; and processing the subtask parameters of the next message at the time indicated in the link to the next message.

Another embodiment of the present invention provides an electronic system for executing concurrent tasks. The system includes a storage memory, a central processor capable of generating and writing messages of the concurrent tasks in the storage memory, a subsystem capable of reading the messages from the storage memory, counters, and semaphores associated with the counters. Each of the tasks is comprised of a first message, a plurality of intermediate messages, and a last message, and each intermediate message comprises at least one subtask parameter and a link to the next message. The subsystem comprises command means for requesting the processing of one of the messages at the time specified in the link of the preceding message, and processing means for processing the message in response to the request. Each of the counters is associated with one of the tasks, is capable of being incremented by the central processor, and is capable of being decremented by the subsystem. Each of the semaphores authorizes an access by the central processor to the counter associated with that semaphore only in the absence of an access by the subsystem to that counter, and authorizes an access by the subsystem to the associated counter only in the absence of an access by the central processor to that counter.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

Preferred embodiments of the present invention will be described in detail hereinbelow with reference to the attached drawings.

Preferred embodiments of the present invention provide a method of processing different concurrent tasks by a subsystem managed by a central processor. The tasks are comprised of successive messages that include a first message, intermediate messages, and a last message. Each intermediate message comprises at least one subtask parameter and a link to the next message indicating the time of processing the next message. The central processor and the subsystem are connected to a plurality of counters associated to respective tasks and to a storage memory.

According to the method, for each task, there is a sub-step of writing by the central processor, and a sub-step of processing by the subsystem. In the sub-step of writing by the central processor, a message is written in the memory, and then if the counter is initially free for access, access to the associated counter by the subsystem is prohibited. And then, if the counter has a zero value, the central processor writes in the subsystem a link indicating the time of processing of the first message by the subsystem. Otherwise, the link to the next message is written in the subsystem, with this link being included in the message written in the memory. Next in the sub-step of writing, the counter is incremented by the central processor by a number representative of the presence of a message of the task in the memory, and then the prohibition against accessing the counter is ended. In the sub-step of processing by the subsystem, if the counter is initially free for access, access to the associated counter by the central processor is prohibited, and then if the counter has a non-zero value, the subsystem reads the link to the next message previously written and decrements the associated counter. Then, the prohibition against accessing the associated counter is ended, and then the subsystem processes the subtask parameters of the next message at the time indicated in that link.

In some embodiments, the link to the next message also indicates the length of the next message. Additionally, in some embodiments, the messages of a task are arranged sequentially in the memory. Preferably, in such embodiments the link to the next message does not comprise the address of the next message in the memory.

In another embodiment, the link to the next message also indicates the address of the next message in the memory. Preferably, in such embodiments prior to writing a message in the memory, the central processor consults the list of available addresses in the memory, determines an address at which to store the message in the memory, and writes the address of the message in the link of the preceding message.

In some embodiments, the link to the next message also indicates the type of the next message. In one such embodiment, at least one link of a message indicates an immediate processing of the next message, and the method further includes immediately processing the next message. Preferably, in such an embodiment, at least one link to the next message indicates a processing conditioned by an external event, and the method further includes: receiving by the subsystem a signal representative of an external event, and then processing the next message by the subsystem. Preferably, the signal is a video synchronization signal.

In some embodiments, the link to the next message indicates the time of processing the next message by a relative time interval separating the processing of the next message and that of the message comprising the link.

Preferably, the first message of a task does not contain subtask parameters, and the last message comprises a link indicating the end of the task. In one embodiment, the indication of the time of processing the next message in the link of the last message comprises a zero value.

In some embodiments, the subsystem executes video processing tasks comprising the management of image acquisition, the management of image display, and image encoding/decoding; and when several links indicate the same time of execution for several messages, the subsystem gives priority to processing the subtask parameters of an image acquisition management message, then to the subtask parameters of an image display message, and then to the subtask parameters of an image encoding/decoding message.

In some embodiments, the subsystem and the central processor receive as input a common clock signal and determine their respective system times on the basis of that clock signal. Preferably, in such embodiments, the processing of parameters of a message is performed when the system time of the subsystem is equal to the time indicated for the processing of the message.

The present invention also provides electronic systems for executing concurrent tasks. One preferred system includes storage memory, a central processor, a subsystem capable of reading the messages written in the storage memory, counters, and semaphores. The central processor is capable of generating and writing successive messages constituting a plurality of concurrent tasks in the storage memory, with each task being comprised of a first message, a plurality of intermediate messages, and a last message, and with each written intermediate message comprising at least one subtask parameter and a link to the next message. The subsystem comprises command means requesting the processing of a message at the time specified in the link of the preceding message, and processing means for processing the message at that time in response to the request. Each counter is associated with one of the tasks, and is capable of being incremented by the central processor and decremented by the subsystem. Each semaphore authorizes an access by the central processor to a counter associated to that semaphore only in the absence of an access by the subsystem to the counter, and authorizes an access by the subsystem to the associated counter only in the absence of an access by the central processor to the counter.

Preferably, the memory comprises at least a plurality of FIFO-type parallel storage lines, whose input is connected to the central processor and whose output is connected to the subsystem.

In some embodiments, the system has a clock that supplies the same clock signal to the central processor and to the subsystem. Preferably, in such embodiments, the central processor and the subsystem each have means for determining a system time as a function of the clock signals. In one embodiment, the subsystem comprises a time module for comparing the system time and the time of execution of a message, and generating the request upon an equality between the system time and the time of execution.

In some embodiments, the subsystem has an input for receiving external events other than clock signals. Preferably, in such embodiments the subsystem is capable of synchronizing the processing of at least one message with a received external event.

In one embodiment, the counter comprises the number of messages of a task stored in the memory.

Accordingly, preferred embodiments of the present invention propose processing different concurrent tasks formed by a first message, intermediate messages, and a last message. The intermediate messages comprise a subtask parameter and a link to the next message, with this link indicating the time for processing the next message. A counter is associated with each task. A semaphore is used to avoid conflicts in accessing the counter, from the central processor or the subsystem. The counter can also discriminate whether the message is a first message, an intermediate message, or a last message.

Such a system can notably reduce, or even eliminate, the sending of information from the subsystem to the central processor to manage the execution of tasks. This system further enables a reduction in the response time requirements for the central processor. This system moreover allows the subtasks of a task to execute at a determined time. This system also allows the subsystem and the central processor to access common data without conflict. In addition, the system allows the load on the central processor's memory to be to relieved.

Figure 1:
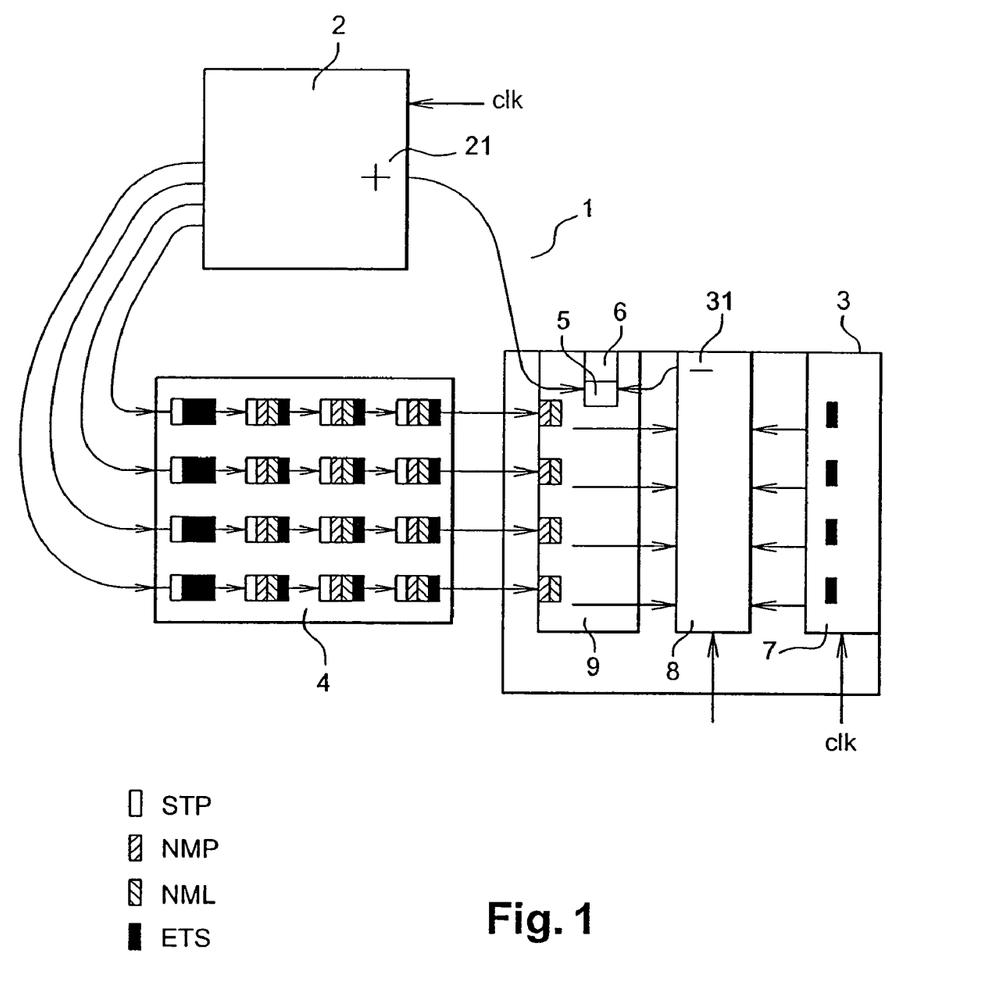
FIG. 1 shows a block diagram of a system in accordance with one embodiment of the present invention.

Exemplary embodiments of the present invention will now be described in detail with reference to FIGS. 1-3. FIG. 1 shows an exemplary embodiment of a system for implementing processes of the present invention. The system 1 comprises a central processor 2, a message processing subsystem 3, and a memory 4. The central processor 2 has write access to the memory 4, while the subsystem 3 has read access to the memory 4. The system 1 further comprises counters 5 that are each associated with a respective task. Each counter 5 is associated with an access management semaphore 6, which manages read and write access of the central processor 2 or the subsystem 3. A time module 7 commands the execution of subtasks by a processing module 8 of the subsystem 3 at determined times. Advantageously, the system 1 of this embodiment also comprises an intermediate storage register 9, which is connected between the memory 4 and the processing module 8.

The subsystem can be implemented by integrating or not integrating the different elements described above. Further, the dimensions of the busses between the different elements of the system 1 are designed so as to ensure sufficient flow rates for the particular application.

The general operation of the system of FIG. 1 in accordance with an embodiment of the present invention is as follows. The central processor 2 generates the messages and determines the times when subtasks are to be executed by the subsystem 3. This management of processing times allows the central processor 2 to easily manage multimedia functions such as fast forward, pause, and the like in audiovisual flows (streams). The synchronization of audio and video flows is moreover easier to manage, especially in the case where one system manages audio flows and another system manages video flows. Examples of message structures are described in detail below.

For each subtask, the central processor 2 carries out a step of writing a message in the memory 4. During this writing step, the central processor 2 writes a message in the memory 4, and a test is made to determine whether the counter 5 is free for access, via the associated semaphore. If the counter is free for access, the central processor 2 prohibits the subsystem 3 from accessing the counter 5. If the counter is not free for access, the central processor 2 renews the test until the counter 5 is free for access. The central processor 2 then reads the value in the counter 5. If the counter 5 has a zero value, the processor writes a link indicating the time of processing of the first message in the subsystem 3, for example in the time module 7. If the counter 5 has a non-zero value, the central processor 2 writes in the subsystem 3 a link to the next message, initially included in the message written in the memory. The counter is incremented by the central processor 2 by a number representing the presence of a message of the task in the memory 4. The central processor 2 thus has an incrementation output 21. The central processor 2 then ends the prohibition against accessing the counter 5.

The subsystem 3 processes the parameters of the messages stored in the memory 4. During a step of processing a message or subtask parameters, the subsystem 3 tests beforehand whether the counter 5 is free for access. If the counter 5 is free for access, the subsystem 3 prohibits the central processor 2 from accessing the counter 5. If the counter 5 has a non-zero value, the subsystem 3 reads the link to the message currently being processed, with this link being contained in the previous message. The counter 5 is then decremented and the prohibition against accessing counter 5 is then ended. The subsystem 3 has an output 31 for decrementing the counter 5.

The subsystem 3 processes the subtask parameters of the current message at the time indicated in the link of the previous message. The time when a message is processed is, for example, managed by the time module 7. The time module 7 compares, for example, the time indicated in the link of the previous message with the current time, for example obtained from a system time shared with the subsystem 3. When the indicated time is equal to the current time, the time module 7 orders the processing of the corresponding message by the subsystem 3.

Authorizations to access the counter 5 are thus managed by the semaphore 6. An exemplary one-bit semaphore is illustrated in FIG. 3. The illustrated semaphore 6 forbids access to an element other than the one being accessed when the bit is equal to 1, and authorizes all access when the bit is equal to 0. The semaphore 6 serves to avoid simultaneous access to the counter 5 by the central processor 2 and the subsystem 3. This prevents erroneous entries in the counter 5.

Several types of counter 5 can be used. For example, the counter 5 can be made to memorize the number of subtasks or messages that remain to be processed for a task, or, again, the counter 5 can produce just a binary state to indicate whether or not a message from the task is present in the memory 4. If the counter 5 memorizes the number of messages that remain to be processed, the central processor 2 can consult the counter 5 to determine whether a defined subtask has been executed. In particular, the counter can serve to discriminate whether the message is a first message of a task, an intermediate message, or a last message. The counter also allows the central processor 2 to reset or erase a task; to do this, the central processor 2 needs only to write a zero value in the counter 5.

Figure 2:
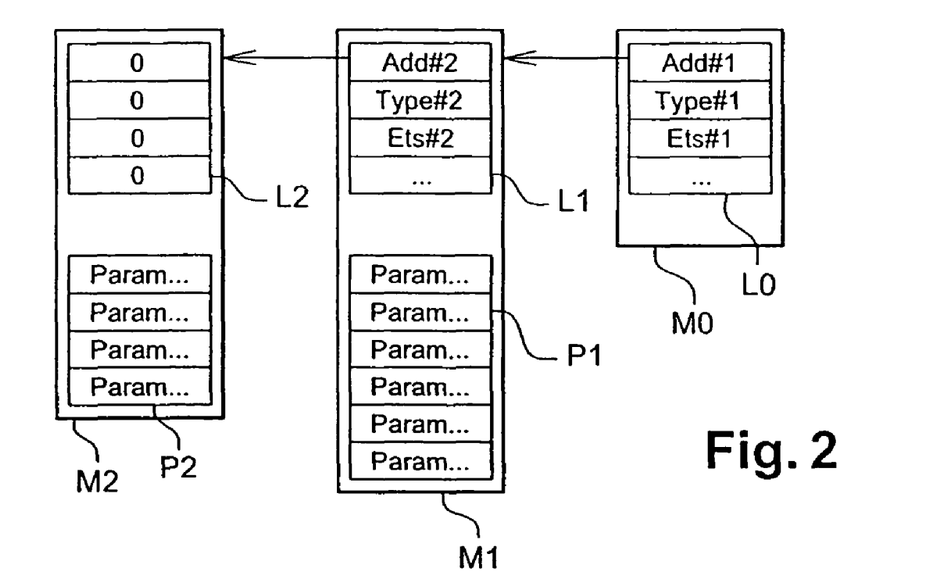
FIG. 2 shows the structure of three successive packets belonging to the same task in accordance with one exemplary embodiment of the present invention.
Figure 3:
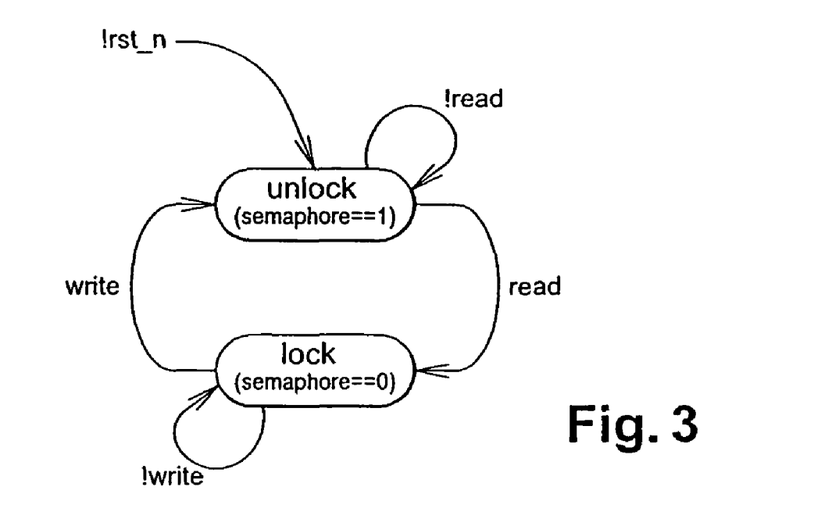
FIG. 3 shows a representation of a semaphore used in one exemplary embodiment of the present invention.

FIG. 2 shows the structure of three successive packets belonging to the same task in accordance with one exemplary embodiment of the present invention in which the system comprises a central processor and a subsystem. As shown, the message structures of a task T comprise three messages M0 to M2. These messages have been generated successively by the central processor. Here, "successively" means that for a given task the messages have been generated in a determined order. The processor can generate messages for other tasks, for example in the interval separating the generation of messages M0 and M1. Message M0 is the first message of task T, message M1 is an intermediate message, and message M2 is the last message of that task.

The message M0 in this embodiment just comprises a link L0 to message M1. This first message M0 preferably does not comprise subtask parameters, since it has not been preceded by any message of task T. Accordingly, the execution time of possible parameters of M0 could not have been defined in another message of task T. Link L0 comprises a pointer to the address of M1 in memory 4, an indicator of the type of the message M1, and an indicator of the execution time of M1. Link L0 can also include an indicator of the length of message M1, a request for the immediate execution of message M1 (which implies the immediate processing of M1 by the subsystem), a request for the conditional execution of message M1 (e.g., by monitoring external events: a signal representing an external event indicated in the request is received, and then message M0 is processed; it is also possible to monitor a video synchronization signal).

The address pointer is fundamental in embodiments in which successive messages of a task are not written one after the other in a FIFO memory. The length indicator allows use of subtask parameters of variable length.

The execution time indicator, contained in L0, specifies the execution time of parameters P1 of M1, defined subsequently. The indicator of the execution time of the next message can be implemented in several ways. There can be used either an absolute indicator that indicates the absolute time of execution relative to the system time, or a relative indicator that defines the time interval separating a message from the next message. The relative indicator makes it easier to modify the execution time of a set of subtasks, since all that is required is to modify one indicator to modify the execution time of the next messages. This type of link is particularly advantageous for managing multimedia functions such as those described above.

The time can be defined by a numerical value, whose increment is a unit time interval, for example the period of one cycle of the system clock. The central processor 2 and the subsystem 3 preferably use the same clock signal.

Generally, each first message and each intermediate message can include the information of L0 described for M0, concerning the next message.

Message M1 has a link L1 to the next message M2, with a structure similar to that of link L0. Message M1 further comprises a zone P1 containing parameters corresponding to data of the task to be processed by the subsystem 3.

Message M2 also comprises a link L2 to a next message, and a zone P2 comprising subtask parameters. Link L2 and zone P2 have the same overall structure as L1 and P1 respectively.

Message M2 preferably comprises a link L2 indicating that M2 is the last message of a task. This reduces requirements for other signaling means for the central processor 2. Preferably, unused zones or indicators of L2 are utilized to indicate that M2 is the last message of task T. It is possible to assign a zero value to an indicator of link L2 to provide that information. Provisions can be made to include a zero value as an indication of the execution time of the next message in L2.

For example, in one illustrative embodiment there is provided a link to the next message having the following structure: a 28-bit size pointer to the next message, an 8-bit size indicator of the type of the next message, and a 32-bit size indicator of the execution time.

Several types of modes for storing messages or message parameters can be employed. In accordance with a first embodiment shown in FIG. 1, with each task processed by the central processor 2 there is associated a line in the FIFO memory. Accordingly, the central processor 2 writes successive messages of a given task at the FIFO memory input. This embodiment enables, if need be, an address pointer not to be written in the link of a message, since successive messages are arranged in the memory one after the other, in the order of processing by the subsystem 3. With each line of the FIFO memory 4, there is associated a memory space of a register 9.

Once a message at the FIFO memory output is processed, its link is stored in the subsystem 3. In the illustrated embodiment, the indicator of the execution time of the next message is stored in the time module, while the next message pointer and the indicator of the length of the next message are stored in register 9. In the figure, the following labels identify portions of messages: STP corresponds to subtask parameters, NMP corresponds to a next message pointer, NML corresponds to next message length indicator, and ETS corresponds to a next message execution time indicator. The next message is then placed at the output of the corresponding line of the FIFO memory 4. This message can be processed since the subsystem 3 has all the information.

In this example, the use of the address pointers NMP is optional since messages of the same task are placed one after the other in a FIFO line by the central processor 2.

It can also be arranged for the central processor 2 to transfer a first message of a task directly into register 9. In general, register 9 can be considered as forming a whole with the memory 4.

In accordance with a second embodiment, the messages or message parameters are stored in an arbitrary memory 4, which is accessible for writing by the central processor and accessible for reading by the subsystem 3. This creates a chained list of messages or subtasks. This memory can be of any type, for example integrated into the subsystem, or split between a memory of the subsystem and an extra external memory.

A subsystem for managing video can implement the following tasks: video decoding, video display, video acquisition (capture), video encoding, video decoding and display, or video acquisition and encoding.

An adapted central processor is used to determine the execution times of different messages of a task, and to define the order of execution of messages belonging to different tasks. However, the following exceptions could occur: the central processor could generate several messages having a link containing the same execution time indication, or orders of priority could have to be modified due to disruptions on a task. There can then be defined orders of priority in the execution, which the subsystem 3 takes into account during those exceptions. For example, the subsystem 3 can carry out several tasks amongst the following: video processing tasks (comprising image acquisition management), image display, and image encoding/decoding management. The subsystem then processes, in decreasing order of priority: the subtask parameters of an image acquisition management message, the subtask parameters of an image display message, and then the subtask parameters of an image encoding/decoding message.

Naturally, the present invention is not limited to the examples and embodiments described and illustrated above, but is amenable to many variants. Thus, although the system has been presented schematically in independent blocks, it can be envisaged in practice to integrate the central processor, subsystem, and memory, or simply to integrate the subsystem and the memory. Likewise, although there has been described the use of a common clock signal to determine a system time in the central processor and in the subsystem, there could alternatively be provided an absolute time common to the central processor and to the subsystem.

Embodiments of the present invention can be embedded in hardware, software, or a combination of hardware and software. Any processor, controller, or other apparatus adapted for carrying out the functionality described herein is suitable. The present invention can also be embedded in a computer program product, which comprises all the features enabling the implementation of the methods described herein, and which—when loaded in an information processing system—is able to carry out these methods. Computer program means or computer program in the present context mean any expression, in any language, code or notation, of a set of instructions intended to cause a system having an information processing capability to perform a particular function either directly or after conversion to another language. Such a computer program can be stored on a computer or machine readable medium allowing data, instructions, messages or message packets, and other machine readable information to be read from the medium. The computer or machine readable medium may include non-volatile memory, such as ROM, Flash memory, Disk drive memory, CD-ROM, and other permanent storage. Additionally, a computer or machine readable medium may include, for example, volatile storage such as RAM, buffers, cache memory, and network circuits. Furthermore, the computer or machine readable medium may comprise computer or machine readable information in a transitory state medium such as a network link and/or a network interface, including a wired network or a wireless network, that allow a device to read such computer or machine readable information.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A method of processing a plurality of concurrent tasks by a subsystem managed by a central processor, the method comprising, for each task, the steps of:
    writing by the central processor, the writing step including the sub-steps of:
        writing a current message of the task in a memory, the task being comprised of a plurality of successive messages including a first message, at least one intermediate message, and a last message, the current message being one of the successive messages of the task that is currently being processed, each of the intermediate messages of the task comprising at least one subtask parameter and a link to the next message of the task that indicates a time for processing the next message of the task, the next message being the next successive message of the task;
        determining if a counter is free for access based on a value of an access management semaphore that is associated with the counter;
        if the counter is free for access, changing the value of the access management semaphore so as to prohibit access by the subsystem to the counter, and:
            if the counter has a zero value, writing in the subsystem a link that indicates a time for processing the first message of the task by the subsystem, or
            if the counter has a non-zero value, writing in the subsystem a link to the next message of the task, this link to the next message of the task being included in the current message of the task written in the memory;
        incrementing the counter by a number representative of presence of the current message of the task in the memory; and
        changing the value of the access management semaphore so as to end the prohibition against the subsystem accessing the counter; and
    processing by the subsystem, the processing step including the sub-steps of:
        determining if the counter is free for access based on the value of the access management semaphore;
        if the counter is free for access, changing the value of the access management semaphore so as to prohibit access by the central processor to the counter;
        if the counter has a non-zero value, reading, from the current message, the link to the next message of the task and decrementing the counter;
        changing the value of the access management semaphore so as to end the prohibition against the central processor accessing the counter; and
        processing the subtask parameters of the next message of the task at the time for processing the next message of the task that is indicated in the link to the next message of the task, this link to the next message of the task being included in the current message of the task.

2. The method according to claim 1, wherein the link to the next message of the task in each of the intermediate messages of the task also indicates a length of the next message of the task.

3. The method according to claim 1, wherein the plurality of successive messages of the task are arranged sequentially in the memory.

4. The method according to claim 3, wherein the link to the next message of the task in each of the intermediate messages of the task does not include an address of the next message of the task in the memory.

5. The method according to claim 1, wherein the link to the next message of the task in each of the intermediate messages of the task also indicates an address of the next message of the task in the memory.

6. The method according to claim 5, wherein the writing step further includes the sub-step of:
    prior to the sub-step of writing the current message of the task in the memory, consulting a list of available addresses in the memory, determining an address at which to store the current message of the task in the memory, and writing the address of the current message of the task in the link of the preceding message of the task.

7. The method according to claim 1, wherein the link to the next message of the task in each of the intermediate messages of the task also indicates a type of the next message of the task.

8. The method according to claim 7, wherein the link to the next message of the task in each of the intermediate messages of the task is capable of indicating an immediate processing of the next message of the task.

9. The method according to claim 8, wherein the link to the next message of the task in each of the intermediate messages of the task is capable of indicating processing of the next message of the task conditioned by an external event.

10. The method according to claim 9, wherein the processing step further includes the sub-step of:

receiving a video synchronization signal representative of an external event, and then processing the next message of the task.

11. The method according to claim 1, wherein the link to the next message of the task in each of the intermediate messages of the task indicates the time for processing the next message of the task by a relative time interval separating the processing of the next message of the task and the processing of the current message of the task.

12. The method according to claim 1, wherein the first message of the task does not include subtask parameters.

13. The method according to claim 12, wherein the last message of the task comprises a link indicating end of the task.

14. The method according to claim 13, wherein the indication of the time for processing the next message of the task in the last message of the task comprises a zero value.

15. The method according to claim 1,
wherein the subsystem executes video processing tasks comprising the management of image acquisition, the management of image display, and image encoding/decoding, and
when two or more links indicate the same time for processing the next message of the task, the subsystem gives priority to processing the subtask parameters of an image acquisition management message, then to the subtask parameters of an image display message, and then to the subtask parameters of an image encoding/decoding message.

16. The method according to claim 1, further comprising the step of providing a common clock signal to the subsystem and the central processor, each of the subsystem and the central processor determining its system time based on the common clock signal.

17. The method according to claim 16, wherein the processing of the subtask parameters of one of the messages of the task is performed when the system time of the subsystem is equal to the time for processing that message that is indicated in the link to that message.

18. An electronic system for executing a plurality of concurrent tasks, the system comprising:
a storage memory;
a central processor for generating and writing messages of the concurrent tasks in the storage memory, each of the tasks being comprised of a plurality of successive messages including a first message, at least one intermediate message, and a last message, each of the intermediate messages of the task comprising at least one subtask parameter and a link to the next message of the task that indicates a time for processing the next message of the task, the next message being the next successive message of the task;
a subsystem for reading the messages of the tasks from the storage memory, the subsystem comprising command means for requesting the processing of one of the messages of one of the tasks at the time for processing the one message of the one task that is indicated in the link of the preceding message of the one task, and processing means for processing the one message of the one task in response to the request;
a plurality of counters, the counters being associated with the tasks such that a different one of the tasks is associated with each of the counters, each of the counters indicating the number of messages of that counter's one associated task that are stored in the storage memory, each of the counters being incremented by the central processor to indicate the writing of a message of that counter's one associated task in the storage memory, and each of the counters being decremented by the subsystem to indicate the reading of a message of that counter's one associated task from the storage memory; and
a plurality of semaphores, the semaphores being associated with the counters such that a different one of the counters is associated with each of the semaphores, each of the semaphores authorizing an access by the central processor to that semaphore's one associated counter only in the absence of an access by the subsystem to that semaphore's one associated counter, and authorizing an access by the subsystem to that semaphore's one associated counter only in the absence of an access by the central processor to that semaphore's one associated counter.

19. The system according to claim 18, wherein the storage memory comprises a plurality of FIFO-type parallel storage lines, the input of each of the storage lines being connected to the central processor and the output of each of the storage lines being connected to the subsystem.

20. The system according to claim 18, further comprising a clock supplying a single clock signal to the central processor and the subsystem.

21. The system according to claim 20, wherein the central processor and the subsystem each include means for determining a system time as a function of the single clock signal.

22. The system according to claim 21, wherein the subsystem comprises a time module for comparing the system time and the time for processing the one message of the one task, and for generating the request upon an equality between the system time and the time for processing.

23. The system according to claim 18, wherein the subsystem includes an input for receiving external events other than clock signals.

24. The system according to claim 23, wherein the subsystem includes means for synchronizing the processing of at least one of the messages of one of the tasks with a received external event.

25. The system according to claim 18, wherein the link to the next message of the task in each of the intermediate messages includes an execution time indicator that indicates the time for processing the next message of the task.

26. A non-transitory machine readable medium encoded with a program for processing a plurality of concurrent tasks by a subsystem managed by a central processor, the program containing instructions for performing, for each task, the steps of:
writing by the central processor, the writing step including the sub-steps of:
writing a current message of the task in a memory, the task being comprised of a plurality of successive messages including a first message, at least one intermediate message, and a last message, the current message being one of the successive messages of the task that is currently being processed, each of the intermediate messages of the task comprising at least one subtask parameter and a link to the next message of the task that indicates a time for processing the next message of the task, the next message being the next successive message of the task;
determining if a counter is free for access based on a value of an access management semaphore that is associated with the counter;
if the counter is free for access, changing the value of the access management semaphore so as to prohibit access by the subsystem to the counter, and:

if the counter has a zero value, writing in the subsystem a link that indicates a time of processing for the first message of the task by the subsystem, or if the counter has a non-zero value, writing in the subsystem a link to the next message of the task, this link to the next message of the task being included in the current message of the task written in the memory;

incrementing the counter by a number representative of presence of the current message of the task in the memory; and changing the value of the access management semaphore so as to end the prohibition against the subsystem accessing the counter; and processing by the subsystem, the processing step including the sub-steps of:

determining if the counter is free for access based on the value of the access management semaphore;

if the counter is free for access, changing the value of the access management semaphore so as to prohibit access by the central processor to the counter;

if the counter has a non-zero value, reading, from the current message, the link to the next message of the task and decrementing the counter;

changing the value of the access management semaphore so as to end the prohibition against the central processor accessing the counter; and processing the subtask parameters of the next message of the task at the time for processing the next message of the task that is indicated in the link to the next message of the task, this link to the next message of the task being included in the current message of the task.

27. The non-transitory machine readable medium according to claim 26, wherein the plurality of successive messages of the task are arranged sequentially in the memory.

28. The non-transitory machine readable medium according to claim 26, wherein the link to the next message of the task in each of the intermediate messages of the task indicates the time for processing the next message of the task by a relative time interval separating the processing of the next message of the task and the processing of the current message of the task.

29. The non-transitory machine readable medium according to claim 26, wherein the program further contains instructions for performing the step of providing a common clock signal to the subsystem and the central processor, each of the subsystem and the central processor determining its system time based on the common clock signal.

* * * * *